(12) United States Patent
Paulik

(10) Patent No.: US 7,337,884 B2
(45) Date of Patent: Mar. 4, 2008

(54) CYCLE BRAKE COOLING ARTICLE

(75) Inventor: Istvan Paulik, Fort Lauderdale, FL (US)

(73) Assignee: Vented Brakes, Inc., Lauderhill, FL (US)

( * ) Notice: Subject to any disclaimer, the term of this patent is extended or adjusted under 35 U.S.C. 154(b) by 133 days.

(21) Appl. No.: 11/074,096

(22) Filed: Mar. 7, 2005

(65) Prior Publication Data

US 2006/0196739 A1    Sep. 7, 2006

(51) Int. Cl.
*B61H 5/00* (2006.01)

(52) U.S. Cl. .................................. 188/264 A

(58) Field of Classification Search ............ 188/264 A, 188/264 AA
See application file for complete search history.

(56) References Cited

U.S. PATENT DOCUMENTS

| 2,248,684 | A | * | 7/1941 | Levy ........................ 188/264 A |
| 2,304,774 | A | * | 12/1942 | Ash ........................... 188/18 A |
| 2,597,603 | A | * | 5/1952 | Tack ........................ 188/264 A |
| 2,644,435 | A | * | 7/1953 | Hoxie ........................ 123/41.65 |
| 2,888,102 | A | * | 5/1959 | Eksergian et al. .......... 188/71.9 |
| 3,051,528 | A | * | 8/1962 | Rogers ......................... 301/6.3 |
| 3,059,730 | A | * | 10/1962 | Nickell et al. ............. 188/71.6 |
| 3,277,985 | A | * | 10/1966 | Caskey .................. 188/264 AA |
| D223,105 | S | * | 3/1972 | Hamond ..................... D12/181 |
| 3,850,267 | A | * | 11/1974 | Odier ........................ 188/71.6 |
| 3,933,136 | A | * | 1/1976 | Burst ........................ 123/41.58 |
| 4,250,979 | A | * | 2/1981 | Kawaguchi ................ 188/71.6 |
| 4,326,610 | A | * | 4/1982 | Mouza .................... 188/218 A |
| 4,450,940 | A | * | 5/1984 | Herbulot ..................... 188/71.3 |
| 4,473,139 | A | * | 9/1984 | Oka et al. ................... 188/71.6 |
| D281,912 | S | | 12/1985 | Rudd |
| 4,620,616 | A | * | 11/1986 | Martin ....................... 188/71.6 |
| 4,632,070 | A | * | 12/1986 | Onda et al. ............... 123/41.58 |
| D290,102 | S | * | 6/1987 | Stahel ........................ D12/126 |
| 4,744,606 | A | * | 5/1988 | Yoshida ...................... 301/6.3 |
| 4,772,299 | A | * | 9/1988 | Bogusz ...................... 55/385.3 |
| 4,793,293 | A | | 12/1988 | Minami |
| 4,805,747 | A | * | 2/1989 | Moedinger et al. ..... 188/264 A |
| 4,810,021 | A | * | 3/1989 | Burst ...................... 296/180.1 |
| 4,901,826 | A | * | 2/1990 | Preiss ...................... 188/264 A |
| D310,191 | S | * | 8/1990 | Yamada et al. ............ D12/126 |
| 4,950,035 | A | * | 8/1990 | Villarreal et al. ............ 301/6.3 |
| 4,979,597 | A | * | 12/1990 | Mehlitz .................. 188/264 R |
| 5,121,972 | A | * | 6/1992 | Glover ........................ 301/6.3 |
| 5,511,847 | A | * | 4/1996 | Weisbarth et al. ........ 296/180.1 |
| 5,526,905 | A | * | 6/1996 | Shimazu et al. ...... 188/218 XL |
| 5,544,726 | A | | 8/1996 | Topouzian et al. |
| 5,954,405 | A | * | 9/1999 | Toman ........................ 301/6.3 |
| 6,033,010 | A | * | 3/2000 | Preiss ...................... 296/180.1 |
| 6,116,365 | A | * | 9/2000 | Preiss et al. ................ 180/68.1 |
| 6,315,091 | B1 | * | 11/2001 | Nilsen et al. ........... 188/264 A |
| 6,578,678 | B2 | | 6/2003 | Lee |
| 6,920,949 | B2 | * | 7/2005 | Matsuura et al. .......... 180/68.2 |
| 2005/0145455 | A1 | * | 7/2005 | Wilson et al. .......... 188/264 A |
| 2006/0191754 | A1 | * | 8/2006 | Toman ................. 188/264 AA |

* cited by examiner

*Primary Examiner*—Bradley King
(74) *Attorney, Agent, or Firm*—Melvin K. Silverman; Yi Li

(57) ABSTRACT

Cycle brake cooling articles are secured at and offset from a circumferential braking element of a wheel of a cycle, each having a rigid surface which in combination with said braking element, defines an air deflection and concentration path that can be focused to the brake element of said cycle wheel to effect a cooling of the element. A distal portion of each rigid surface is securable to a front fork of the cycle.

5 Claims, 6 Drawing Sheets

CYCLE BRAKE COOLING ARTICLE

BACKGROUND OF THE INVENTION

1. Area of Invention

The present invention relates to motorcycles.

2. Prior Art

Brakes work by using friction to slow a rotating disc or drum, a rotor thereof, turning kinetic energy into thermal energy. Metal-backed fiber pads or shoes are pressed onto the rotor by a hydraulic or mechanical article to create friction. During this process, the pads or shoes are subject to wear and overheating. One effect of overheating of brake components is warping or coning of the brake rotor. Another result of overheating is a reduction in frictional properties at the brake interface above a predetermined temperature. This may result in longer stopping distances, especially after repetitive heavy stopping. Preventing the frictional surfaces from exceeding the predetermined temperature will provide greater durability and life for the brake rotor and pads.

The terms cycle and motorcycle as used herein denote motorbikes, mopeds, cycles, scooters and the like.

The prior art includes means for brake rotor ventilation and cooling for motor vehicles as shown in U.S. Pat. No. 5,544,726 to Topouzian et al. and U.S. Pat. No. 6,578,678 to Lee. The prior art also includes a motorcycle carburetor cooling air duct as shown in U.S. Pat. No. 4,793,293 to Minami. U.S. Design Pat. No. 281,912 to Rudd discloses an ornamental design for a motorcycle cover light and air scoop.

It would be desirable to provide a brake cooling article, for a motorcycle having improved properties of heat transfer out of a corresponding brake rotor that is cost-effective and easy to install as an aftermarket product. The present invention addresses this long felt need in the art.

SUMMARY OF THE INVENTION

A cycle brake cooling article, secured at and offset from a circumferential braking means of a wheel of a cycle, includes a rigid surface which, in combination with said braking means, defines an air deflection and concentration channel therein, attached to a front fork of a cycle. A path of air is focused toward the braking means of said cycle wheel. Said rigid surface includes an intake and deflection surface which defines an air intake. The cycle brake cooling article also includes an air focusing surface of reduced horizontal transverse cross-section relative to said intake surface and is dependent from a vertical edge of said primary surface. The brake cooling article includes a front fork securing portion dependent from a distal vertical edge of the air focusing surface. A distal portion of the air focusing surface includes tabs for securing the cooling article to a front fork of the cycle.

Said rigid surface includes a line of dependency comprising means for bendable adjustment of said intake surface relative to said air focusing surface. A second line of dependency comprises means for bendable adjustment of said air focusing surface relative to said front fork securing tabs. A third line of dependency comprises means for bendable adjustment of opposing upper and lower portions of the intake surface to selectably vary a vertical dimension of the intake of said primary surface to thereby control volume, path, and rate of air flow into the air focusing surface. The opposing upper and lower portions of the intake surface define a length of about 1 to about 3 centimeters. The tabs include an engagement site which exhibits a width of about 0.6 to about 1.2 centimeters.

It is an object of the invention to provide an improved motorcycle brake cooling means.

It is another object is to improve the longevetiy of the brake pads and braking elements.

It is a further object to provide an article of the above type that can be retro-fit to a cycle as an after-market product.

The above and yet other objects and advantages of the present invention will become apparent from the hereinafter set forth Brief Description of the Drawings, Detailed Description of the Invention, and Claims appended herewith.

DETAILED DESCRIPTION OF THE INVENTION

Figure 1:
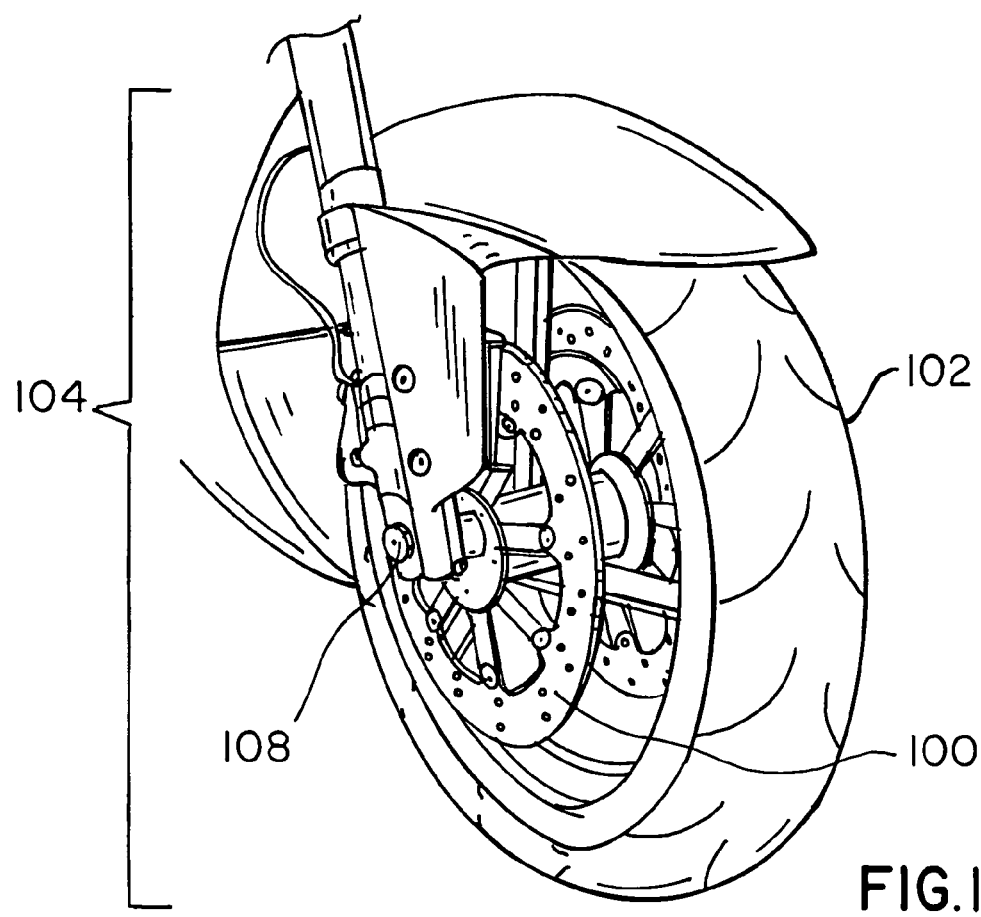
FIG. 1 is a perspective view of a front or proximal portion of a motorcycle showing the general geometry and position of the inventive cycle brake cooling article.
Figure 3:
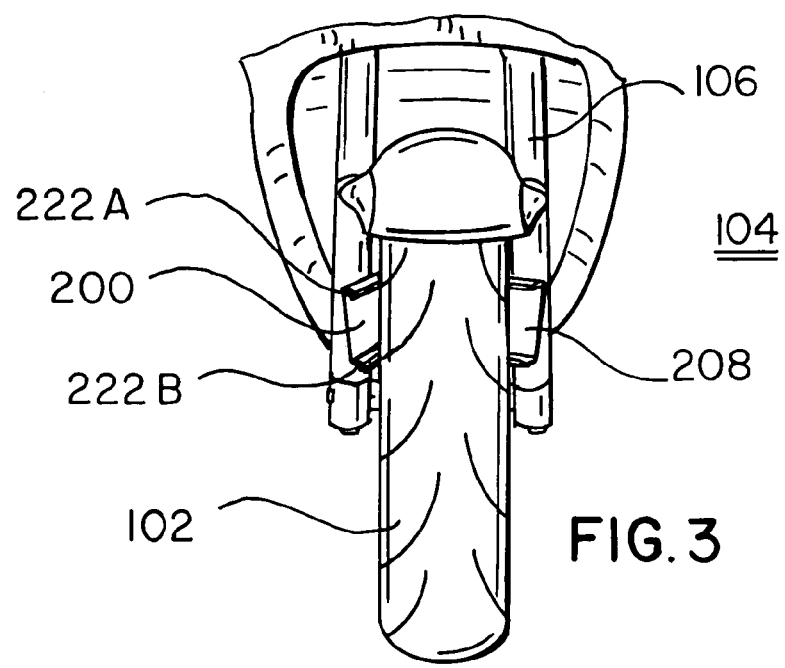
FIG. 3 is a perspective front view of the front portion of the motorcycle with cooling elements placed on opposing sides of the front wheel axle.
Figure 2:
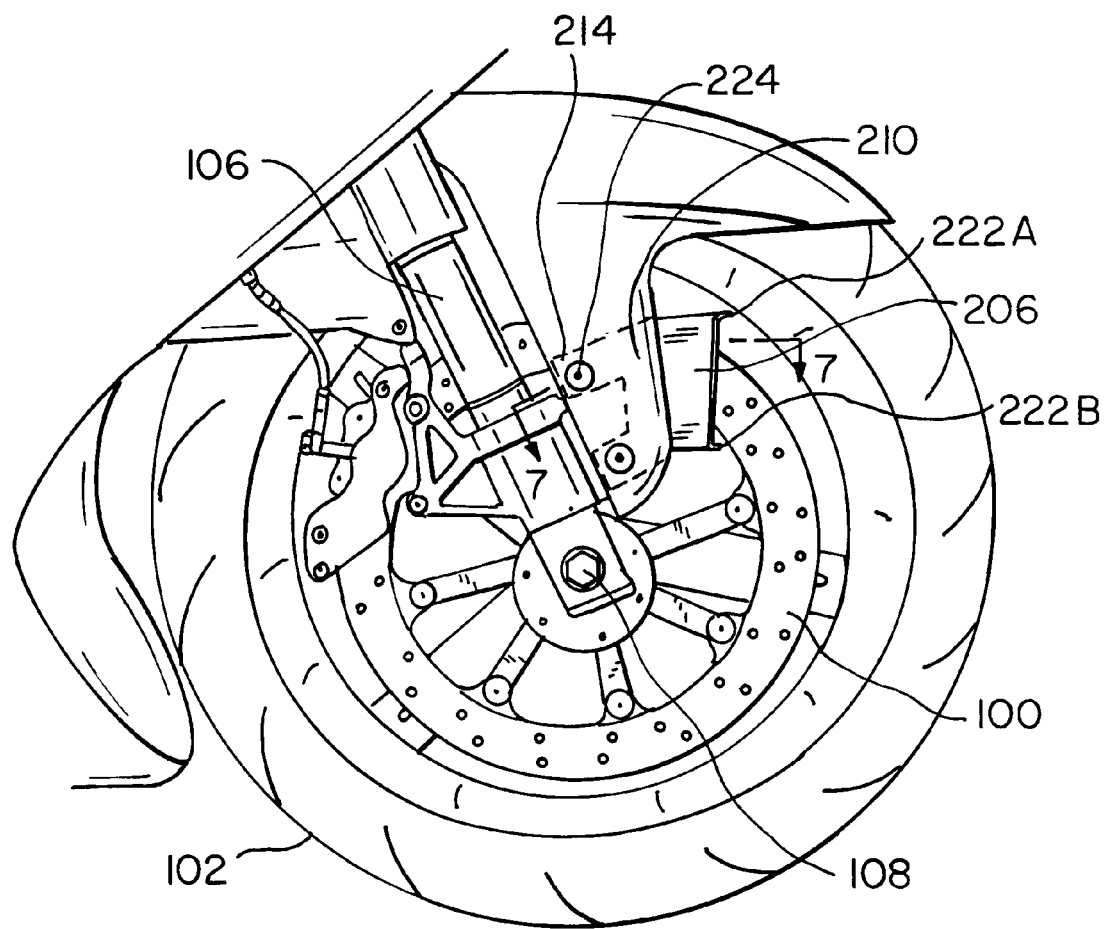
FIG. 2 is a perspective side view of the cycle brake cooling element illustrating its placement near to the brake rotor or horizontal surfaces of the cycle wheel.

With reference to FIGS. 1 and 2 them is shown, in perspective view, cycle brake cooling article 200 secured at and offset from a circumferential annular braking element 100 at opposing sides of each wheel 102 of a cycle 104, the horizontal position of which relative to front wheel 102 of a cycle 104 is also shown. In FIG. 2 also may be seen the general geometry of the inventive cycle brake cooling article 200, attached to each side of the front fork 106. The brake cooling article may be attached to one side or both sides of the front fork 106. The brake cooling article may also be attached through a fender and the front fork. In FIG. 3 fork 106 is shown mounted to both sides of axle 108 of the front wheel 102 of the cycle 104.

Figure 5:
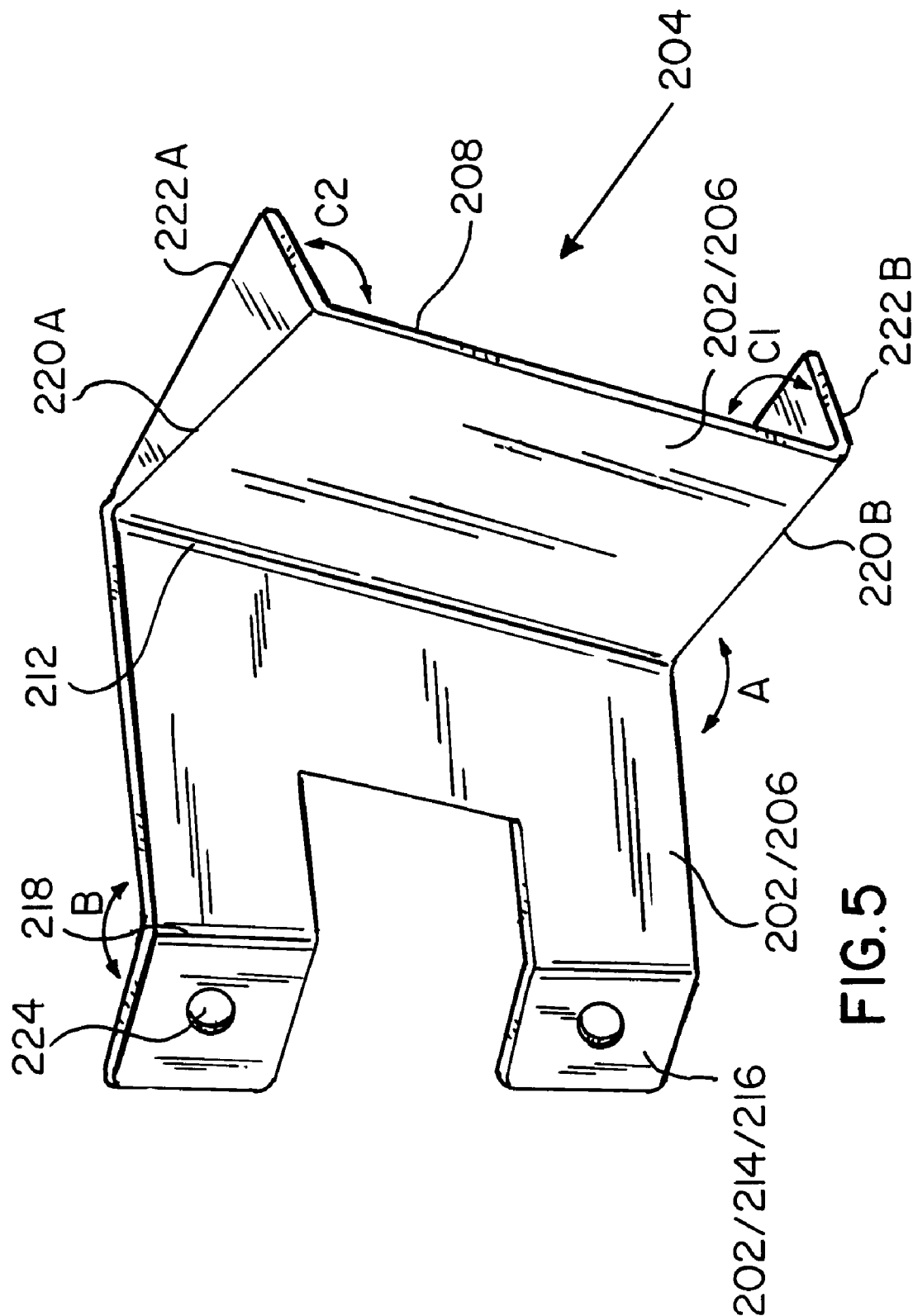
FIG. 5 is a perspective view of a single brake cooling article.
Figure 6:
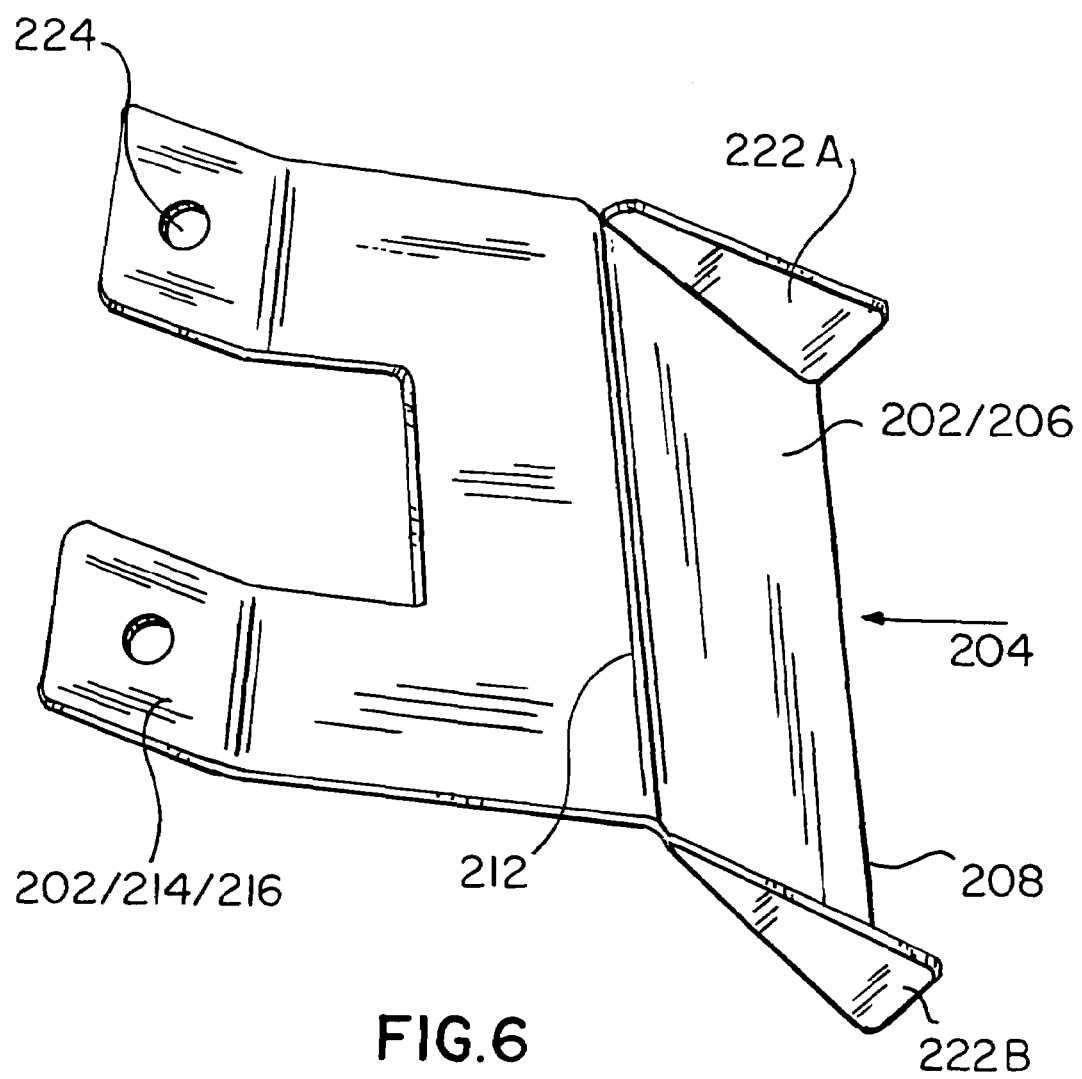
FIG. 6 is a perspective reverse view of the cycle brake cooling article.

In FIGS. 5 and 6 the cycle brake cooling article 200 alone may be seen to include a rigid surface 202, in combination with the braking element 100, defining an air deflection and intake path 204 therein. Said path is focused upon the brake element 100 of each cycle wheel 102. By forcing the airflow into a Venturi-like reduced volume, the air intake path 204 is concentrated and accelerated, thus enhancing its cooling capacity when it comes into contact with said brake element.

Figure 7:
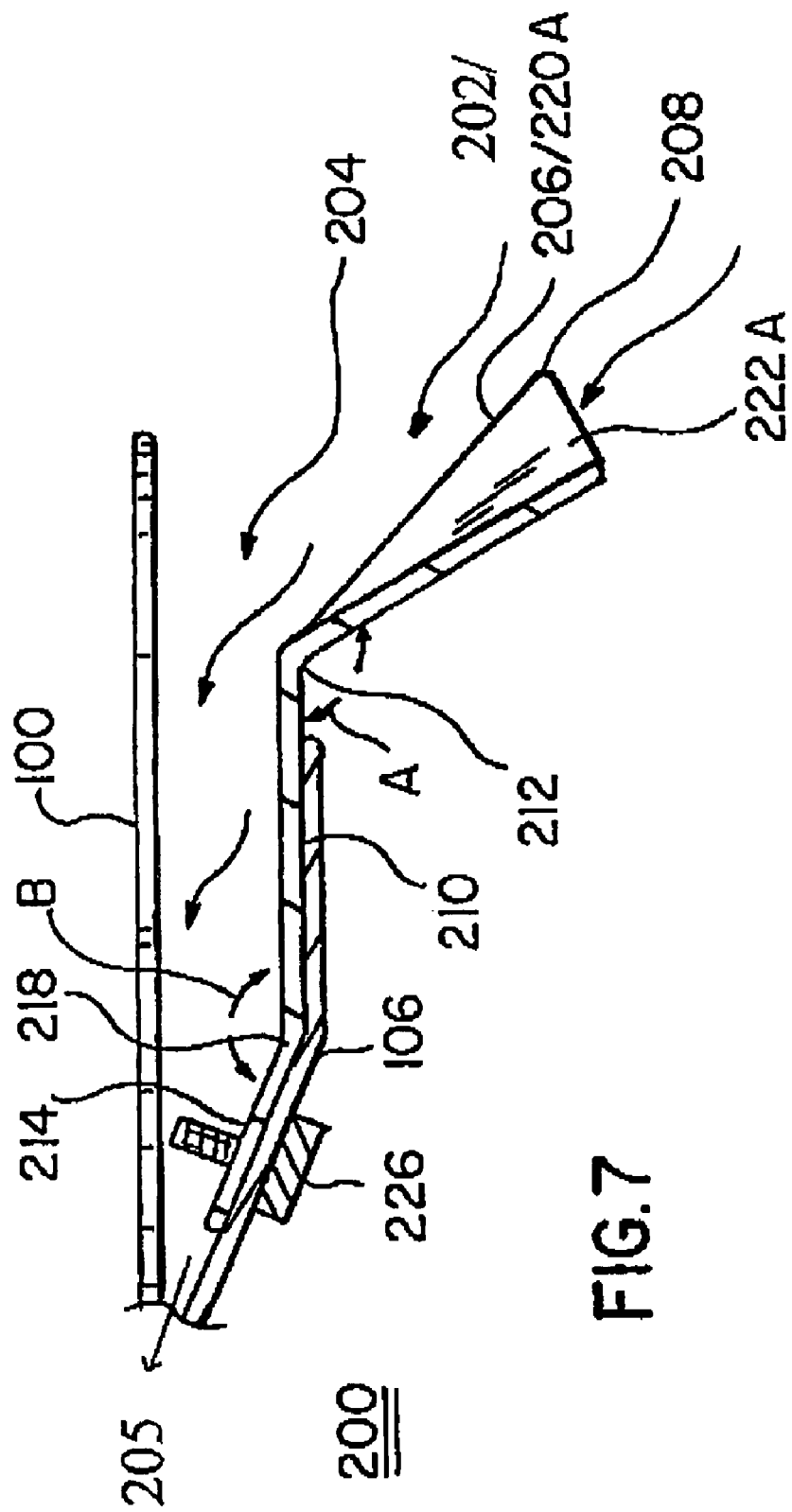
FIG. 7 is an enlarged, horizontal cross sectional view of a cooling article attached to a front fork and showing the direction of air flow between the brake disc and the inventive article.

As shown in FIGS. 5-7 the rigid surface 202 also includes a deflection surface 206 which defines the air intake from a proximal edge 208 of surface 206. Also, the rigid surface 202 includes an air focusing surface 210 of reduced horizontal and volumetric cross-section relative to the intake path 204 and is dependent at a vertical edge 212 of the intake surface 206.

In FIG. 7 may be seen a front fork securing portion 214 dependent from a distal vertical edge 216 of the air focusing surface 210. This allows for further focus of air relative at article output 205 and against the annular structure of the braking elements 100. The rigid surface 202 also includes said distal portion 216 of said air focusing surface 210, which includes tabs 214 for securing the article 200 to said front fork 106 of said cycle 104, and enabling said article output 205.

Rigid surface 202 includes said edge 212 which is a first line of dependency which defines means for bendable adjustment of the intake surface 206 relative to the air focusing surface 210. (See FIGS. 5 and 6). Said first line of dependency 212 allows for control of the volume of air deflected into the air deflection and concentration path 204. If the intake surface 206 is bent too far away from the air focusing surface 210 and away from the brake element 100, the air intake will decrease resulting in a decreased cooling capacity. An optimum total included Angle A between surfaces 206 and 212 is typically about 120 degrees. (See FIG. 7).

A second line of dependency 218 defines means for bendable adjustment of Angle B of the tabs 214 relative to the air focusing surface 210. (See FIGS. 5 and 7). Again, the adjustment of the upper and lower portions 222A and 222B relative to the air focusing surface 210 can create an increase or decrease in the cooling capacity. Angle B is typically in the range of 90 to about 130.

Figure 4:
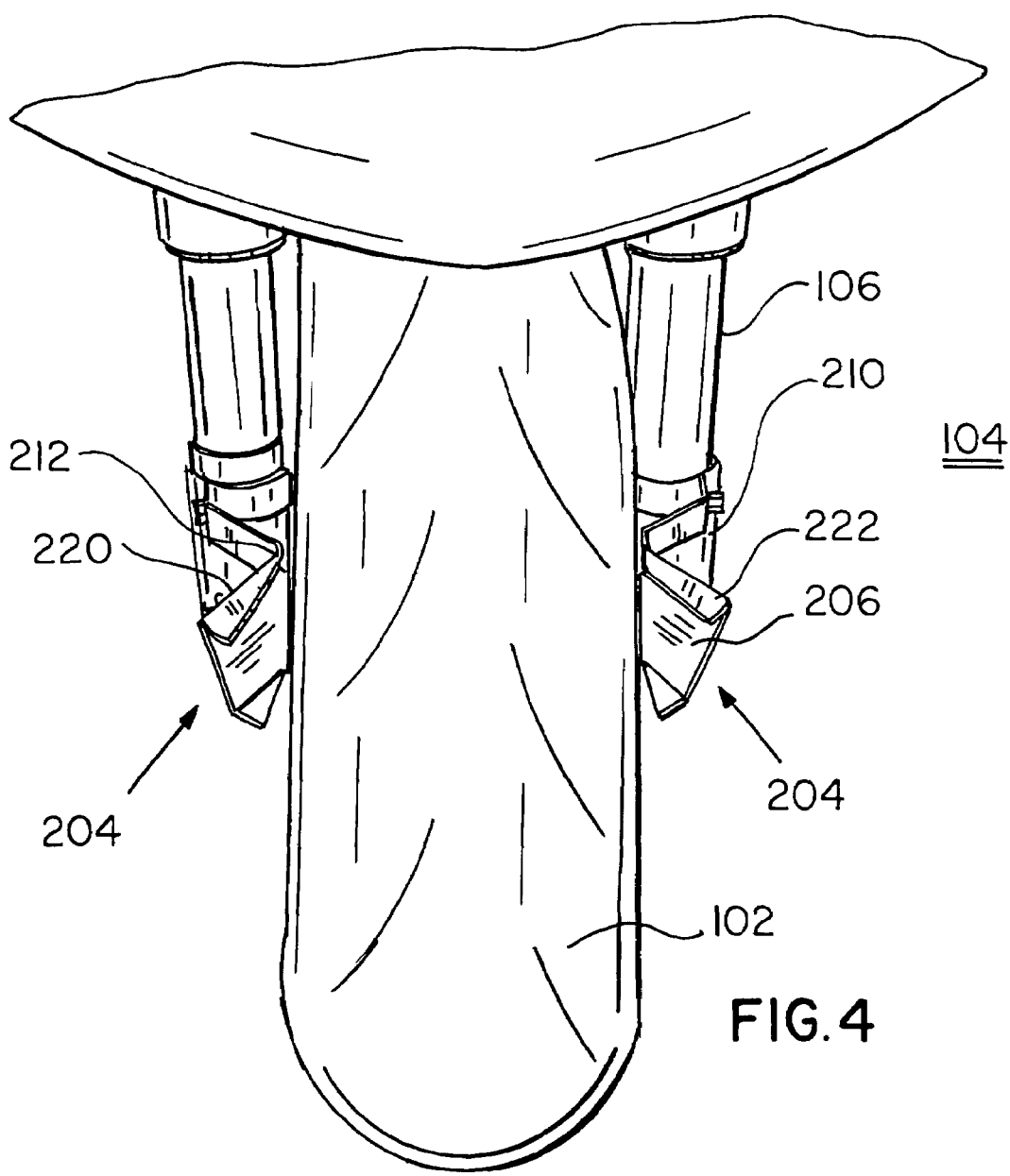
FIG. 4 is an enlarged view of the cooling articles showing the direction of air flow.

FIGS. 5 and 6 show opposing third lines of dependency 220A and 220B which define means for bendable adjustment of opposing upper and lower portions 222 of the intake surface 206 to selectably vary the volume of the intake or Angles C1 and C2 of said intake surface 206 to thereby control volume, speed and path of air flow 204 into the air focusing surface 210. The adjustment of the opposing upper and lower portions 222 of the intake surface 206 allow air to be focused more towards the air deflection or concentration path 204 or away from the path causing more or less air intake relation to said Angles C1 and C2 which will have a typical angel of 45 to about 135 degrees. (See FIG. 4) Angles C1 and C2 are typically the same, but can be modified to fit a specific type of cycle. The upper and lower portions 222 of the intake surface 206 define a longitudinal length of about 1 to about 3 centimeters.

In FIGS. 5 and 6 it is shown that the tabs 214 include engagement sites 224. The engagement sites exhibits a width of about 0.6 to about 1.2 centimeters. A locking nut 226 or other attachment means is used to secure the tabs 214 to the front fork. Alternatively, the tabs may be secured by a locking nut through the front fork and fender. Each tab may be the same length as the other or they may be different lengths, depending on the design and structure of the cycle.

The brake cooling article is typically made of a lightweight material for cycles traveling at high speeds. The lightweight materials include aluminum, fiber glass, carbon fiber, and other lightweight alternatives.

While there has been shown and described the preferred embodiment of the instant invention it is to be appreciated that the invention may be embodied otherwise than is herein specifically shown and described and that, within said embodiment, certain changes may be made in the form without departing from the underlying ideas or principles of this invention as set forth in the Claims appended herewith.

What is claimed is:

1. A cycle brake cooling article, securable at, and offset from, an annular brake surface upon a wheel of a cycle, said cycle including a wheel fork, the article comprising:

a rigid air focusing surface proportioned in substantially vertical dimension to an annular dimension of said brake surface when said rigid surface is secured to said wheel fork, said rigid surface in combination with said annular brake surface, defining an air deflection and concentration path, said rigid surface of said article also having a geometry defining an intake path, a deflection path and a narrowed outlet channel, said air focusing surface proportioned to reduce air volume relative to said intake, directing air flow to said outlet channel and against an entire annular dimension of said brake surface, in which said air focusing surface includes a distal portion having tabs for securing said air focusing surface to said wheel fork of said cycle, and a bendable first line of dependency between said intake surface and said air focusing surface comprising means for bendable adjustment therebetween.

2. The cycle brake rotor cooling article as recited in claim 1, further including a bendable second line of dependency of said tabs relative to said air focusing surface, comprising means for bendable adjustment therebetween.

3. The cycle brake cooling article as recited in claim 1, further includes opposing bendable other lines of dependency between opposing upper and lower portions of said intake surface comprising means to selectably vary a vertical dimension of a proximal end of said intake of said intake surface to thereby control volume, path, and speed of air flow into said air focusing surface.

4. The cycle brake cooling article recited in claim 3, in which said opposing upper and lower portions of said intake surface each define a length in the direction of air flow of about 1 to 3 centimeters.

5. The cycle brake cooling article as recited in claim 1, in which said tabs include engagement sites exhibiting a width of about 0.6 to about 1.2 centimeters.

* * * * *